US009269267B2

(12) United States Patent
Goodwin

(10) Patent No.: US 9,269,267 B2
(45) Date of Patent: Feb. 23, 2016

(54) DRIVER INITIATED VEHICLE-TO-VEHICLE ANONYMOUS WARNING DEVICE

(75) Inventor: Cecil Wayne Hilton Goodwin, Jacksonville Beach, FL (US)

(73) Assignee: TomTom North America Inc., Lebanon ( * ) Notice: Subject to any disclaimer, the term of this patent is extended or adjusted under 35 U.S.C. 154(b) by 0 days.

(21) Appl. No.: 13/474,852

(22) Filed: May 18, 2012

(65) Prior Publication Data

US 2012/0229301 A1 Sep. 13, 2012

Related U.S. Application Data

(63) Continuation of application No. 12/179,424, filed on Jul. 24, 2008, now abandoned.

(51) Int. Cl.

| | |
|---|---|
| ***G08G 1/00*** | (2006.01) |
| ***G08G 1/16*** | (2006.01) |
| ***G08G 1/09*** | (2006.01) |
| ***B60Q 1/00*** | (2006.01) |
| ***G08B 1/08*** | (2006.01) |
| ***G05D 1/02*** | (2006.01) |
| ***H04L 12/28*** | (2006.01) |
| ***H04B 7/00*** | (2006.01) |

(52) U.S. Cl.
CPC .................................... *G08G 1/162* (2013.01)

(58) Field of Classification Search
CPC ........................................................ G08G 1/00
USPC .......................................................... 340/902
See application file for complete search history.

(56) References Cited

U.S. PATENT DOCUMENTS

| | | | |
|---|---|---|---|
| 6,708,107 | B2 | 3/2004 | Impson et al. |
| 6,765,495 | B1 | 7/2004 | Dunning et al. |

(Continued)

FOREIGN PATENT DOCUMENTS

| | | | |
|---|---|---|---|
| CN | 1124858 | A | 6/1996 |
| CN | 1161750 | A | 10/1997 |

(Continued)

OTHER PUBLICATIONS

Search Report issued Jan. 4, 2012 for European Application No. 09800986.3.

(Continued)

*Primary Examiner* — Jennifer Mehmood
*Assistant Examiner* — John Mortell

(57) ABSTRACT

A driver-initiated warning device is described for communicating descriptive vehicle-to-vehicle warning messages. The device can be deployed within an automobile and can include an interface that receives input from a driver or passenger of a vehicle. The device also includes a vehicle-to-vehicle communications component that generates anonymous messages upon having received the input and broadcasts the anonymous messages to other vehicles within range. The anonymous messages have embedded electronic data regarding an event observed by the driver or passenger, such as location information of a road hazard. Based on receiving the messages, the device can make decisions as to whether to alert the driver of any upcoming dangers or other events. The location information contained in the messages can be used to filter the messages based on relevance. The messages can also be relayed to other vehicles in order to optimize information diffusion between moving automobiles.

21 Claims, 11 Drawing Sheets

(56) References Cited

U.S. PATENT DOCUMENTS

| | | | | |
|---|---|---|---|---|
| 7,046,168 | B2 | 5/2006 | Tsuboi | |
| 7,188,026 | B2 | 3/2007 | Tzamaloukas | |
| 7,212,134 | B2 * | 5/2007 | Taylor | 340/901 |
| 7,330,103 | B2 * | 2/2008 | Boss et al. | 340/435 |
| 7,352,291 | B2 * | 4/2008 | Reumerman | 340/905 |
| 7,567,562 | B2 * | 7/2009 | Lee et al. | 370/389 |
| 7,593,999 | B2 * | 9/2009 | Nathanson | 709/217 |
| 7,657,373 | B2 | 2/2010 | Kindo | |
| 7,720,060 | B2 | 5/2010 | Greene et al. | |
| 8,289,186 | B2 * | 10/2012 | Osafune | 340/903 |
| 8,410,956 | B2 * | 4/2013 | Bai et al. | 340/905 |
| 2002/0030611 | A1 | 3/2002 | Nuesser et al. | |
| 2002/0198660 | A1 | 12/2002 | Lutter et al. | |
| 2003/0141990 | A1 | 7/2003 | Coon | |
| 2005/0221759 | A1 * | 10/2005 | Spadafora et al. | 455/41.2 |
| 2005/0222755 | A1 | 10/2005 | Tengler et al. | |
| 2007/0096892 | A1 | 5/2007 | Nathan et al. | |
| 2007/0162550 | A1 | 7/2007 | Rosenberg | |

FOREIGN PATENT DOCUMENTS

| | | | |
|---|---|---|---|
| CN | 1905717 | A | 1/2007 |
| EP | 1291824 | A1 | 3/2003 |
| EP | 1441321 | A2 | 7/2004 |
| JP | H08263783 | A | 10/1996 |
| JP | 2001283381 | A | 10/2001 |
| JP | 2004118609 | A | 4/2004 |
| JP | 2004145398 | A | 5/2004 |
| JP | 2004147141 | A | 5/2004 |
| JP | 2004343507 | A | 12/2004 |
| JP | 2007104568 | A | 4/2007 |
| JP | 2007248425 | A | 9/2007 |
| JP | 2011527474 | A | 10/2011 |
| WO | 2010003440 | A | 1/2010 |

OTHER PUBLICATIONS

International Search Report issued Sep. 15, 2009 for International Application No. PCT/US2009/051490.

Delot et al. "Estimating the Relevance of Information in Inter-Vehicle Ad Hoc Networks," Mobile Data Management Workshops, 2008. MDMW 2008. Ninth International Conference on, pp. 151-158, Apr. 27-30, 2008. [Retrieved from Internet: <http://www.univ-valenciennes.frIROI/SIDItdelot/vespa/ vespa_fichiers/EstimatingRelevanceInformation.pdf>].

Yang et aL "Position-based Adaptive Broadcast for Inter-Vehicle Communications," Communications Workshops, 2008. ICC Workshops '08. IEEE International Conference on, May 19-23, 2008,410-414 [Retrieved from Internet<URL: http://202.194.20.8/proc/icc2008/DATA/S 12S06P08. PDF>].

* cited by examiner

DRIVER INITIATED VEHICLE-TO-VEHICLE ANONYMOUS WARNING DEVICE

CROSS REFERENCE TO RELATED APPLICATIONS

This application is a continuation of U.S. patent application Ser. No. 12/179,424 now abandoned, filed Jul. 24, 2008, and entitled "Driver initiated vehicle-to-vehicle anonymous warning device"; the entire content of which is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to vehicles and communications and more particularly to communicating driver-initiated electronic warning messages between moving vehicles.

BACKGROUND

In recent years, automobiles and other vehicles have become increasingly integrated with onboard computing systems, software and other related technologies. Virtually every feature in today's standard automobile has become reliant on one form of computer or another. From computer-controlled engine timing and emission technologies, to global positioning and navigation systems, the automobile is quickly becoming a collection of software and hardware systems that provide a wide variety of features to drivers and passengers.

Much research has gone into providing driver assistance and auto driving capabilities in the automobile. For example, advanced parking guidance systems have surfaced, which aid the driver in parallel parking the automobile and in other similar situations. Some manufacturers have also implemented on-board emergency response systems, such as Onstar, in case of accidents or automobile collisions. However, there is still much room for improvement by way of automated assistance during everyday driving.

In daily driving situations, hazardous conditions or events often occur which require quick response on the part of a driver of an automobile. For example, a flooded area of a road, the presence of an emergency vehicle or an accident may occur rapidly on the road network. Communication of warnings regarding such events and their respective locations would often be helpful and facilitate a quick response on the part of warned drivers. Most of today's standard non-broadcast communication methods, such as cellular telephones, are not well suited for such uses because they generally require some kind of identity (e.g. phone number) of the person intended to be warned, which is not readily available in most emergency situations. In addition, the time taken to use a cell phone, radio or other device is excessively long since the warned vehicle may have very little time to adjust speed or change lanes before encountering the hazardous or otherwise risky situation. Even though identifiers are not needed for broadcast technologies, time and bandwidth limitations still apply.

In the past, drivers have given independent and anonymous warnings to other drivers of significant events or locations of things by direct short-range broadcast communications, such as citizen's band (CB) radio, or by flashing headlights to warn oncoming drivers of the presence of hazards in the road (e.g. broken-down vehicles or emergency vehicles). However, these types of warnings are severely limited in many ways. For example, the flashing headlights fail to specify anything about the hazardous event, such as its description, location, importance and other information. By using CB radio, the driver may be able to provide some verbal instructions, however this is often too imprecise and too time-consuming to provide any significant benefit, in addition to being cumbersome to use. Furthermore, most drivers do not carry CB radios and do not wish to continuously listen for various transmissions while driving the vehicle. As such, another approach is needed.

Recently, the Dedicated Short Range Communications (DSRC) protocol has been created to specifically address communications within the context of automotive use. DSRC is a wireless RFID-based technology, mainly used for communications between automobiles and roadside equipment, such as automatic toll collection machinery and the like. DSRC has also been proposed for use between automobiles for various purposes.

Generally, it is undesirable for communications to require extensive dedicated infrastructure, such as road-side transmitting equipment, since such equipment is likely to be concentrated spatially and not be pervasive across a road network. A method is needed to spread anonymous location-dependent information quickly within a local area at the will of a driver or other vehicle occupant and without requiring extensive infrastructure. Furthermore, it is desirable that the information spread quickly and efficiently, without requiring knowledge of driver and automobile identity or other dedicated information. Applicant has identified the foregoing, as well as other shortcomings and needs which currently exist in the art in coming to conceive the subject matter of the present disclosure.

DETAILED DESCRIPTION

Figure 1:
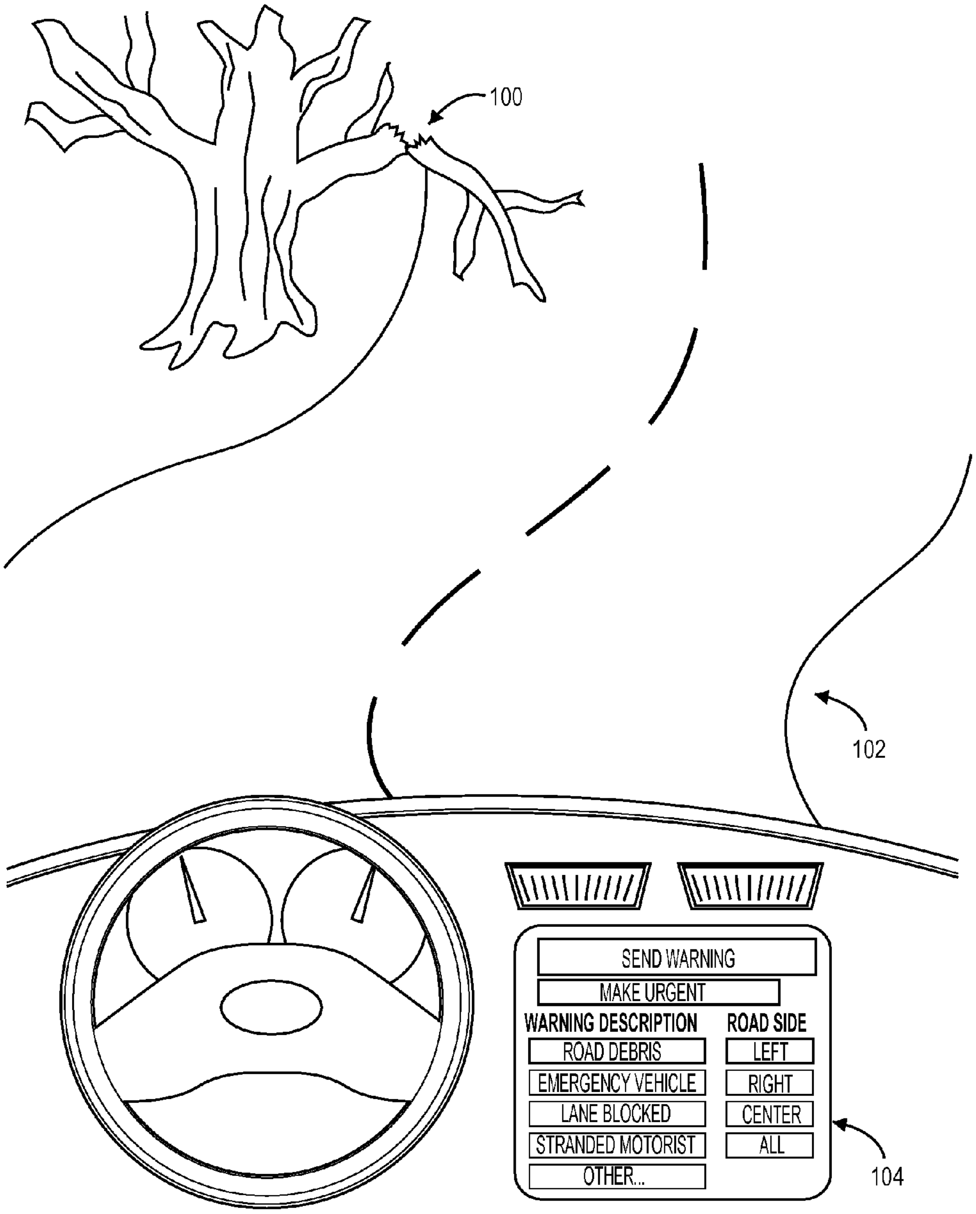
FIG. 1 is a high level illustration of the driver-initiated warning device inside of an automobile, in accordance with various embodiments.

The invention is illustrated by way of example and not by way of limitation in the figures of the accompanying drawings in which like references indicate similar elements. References to embodiments in this disclosure are not necessarily to the same embodiment, and such references mean at least one. While specific implementations are discussed, it is understood that this is done for illustrative purposes only. A person skilled in the relevant art will recognize that other components and configurations may be used without departing from the scope and spirit of the invention.

In the following description, numerous specific details are set forth to provide a thorough description of the invention. However, it will be apparent to those skilled in the art that the invention may be practiced without these specific details. In other instances, well-known features have not been described in detail so as not to obscure the invention.

The embodiments of the present invention provide systems, methods and devices for providing driver-initiated vehicle-to-vehicle warnings and messages. The device can be deployed in a vehicle (e.g. automobile) as a stand-alone appliance or integrated with various computing systems of the vehicle. In one embodiment, the device includes a driver input interface for receiving input from the driver or passenger of the vehicle. The interface can be a graphical user interface (GUI), such as a touch screen, a button-based interface, or a voice recognition-based interface or any other type of interface available in the art. The driver input interface is used to receive information regarding an event occurring within a visually observable vicinity of the vehicle. The event can be any event of potential interest to the driver of the vehicle and/or other drivers of other vehicles in the area. For example, common road hazards or blocks, emergency vehicles, accidents, stranded motorists, debris, dense traffic situations and other observable situations can constitute events that are described by using the interface of the warning device. In addition, the events can also include moving events, such as hit and runs, amber alerts and other situations that continuously change locations.

Once input is received regarding an event, a vehicle-to-vehicle communications component of the device can generate an anonymous message and transmit the message to one or more other vehicles within the communications range of the initiating vehicle. The message can be based on the DSRC protocol and can contain embedded electronic data that describes the event. In one embodiment, the message contains the specific location information of the event obtained by consulting the vehicle's global positioning system(s) (GPS) and/or map database(s). GPS systems are well known in the art and can be used to calculate the position of the vehicle by communicating with a satellite. The position of the vehicle, along with any input from the driver/passenger can be used to calculate the specific location of the event. This location can then be used to generate warnings in the receiving vehicle depending on the applicability of the event to the receiving vehicle. As an illustration, if the event is a road condition that only affects automobiles traveling in one lane or direction, the message can generate warnings in other vehicles which will be traveling in the same direction. Receiving vehicles which are traveling in other direction(s) or lane(s), can filter out and ignore the messages as being inapplicable.

In one embodiment, the message is anonymous with respect to the identity of any sender, receiver or vehicle. This eliminates the need for drivers to know or to enter contact information of the receiving vehicles. In one embodiment, the message can be broadcast (multicast) to multiple automobiles, requiring no guarantee of reception. The digital location information, along with any other data embedded in the messages can then be used to filter and determine the applicability of the messages to each receiving vehicle.

In various embodiments, the receiving vehicle can relay the message to other vehicles within its range of communication. This causes the effective range of the warning to increase because the receiving vehicle can travel a certain distance before relaying the message to another vehicle. Thus, while the initiating vehicle's maximum range of communications can be limited, the warning message can potentially cover distances substantially greater than that maximum, due to the relaying capabilities of the moving vehicles. For example, DSRC can be used to broadcast short messages within a range up to 1000 meters, initiated by the alerting vehicle's driver (or other occupant). Depending on the message header, each vehicle receiving such a message can ignore or relay the message to others nearby. In situations of dense traffic, a diffusion process can occur, resulting in the information being carried rapidly to others, potentially over distances far exceeding the range of vehicle-to-vehicle communications component itself. Such communications can be filtered in vehicles to prevent the same message being received and/or processed twice. The messages can also be transferred in sparse density traffic situations if the communications are confined to approaching vehicles by filtering in receiving vehicles based on direction of travel for sender and receiver. In this situation, one vehicle may warn multiple other vehicles, in succession, traveling counter to its direction of travel, or a warned vehicle may pass warnings to others behind it and traveling in its direction of travel if in range. In one embodiment, the warning device can optimize information diffusion to maximize the number of other vehicles receiving the warning messages, or may minimize or otherwise tailor warnings depending on parameters set by the receiving driver. By using a digital map in both sending and receiving vehicles, location information can be included in the warning and used by the embodiments to make logical decisions about warning applicability in terms of function and spatial extent based on location of sender and receiver.

In accordance with the preferred embodiment, information about an event noticed by a driver, such as a hazardous road condition or the presence of an emergency vehicle, is broadcast to all similarly equipped vehicles in order to alert the receiving devices and drivers to the presence of the sensed event. The information sent includes the event's location and other parameters according to sending driver intent and device logic. Location information may be sent in a map-agnostic way such as the AGORA-C location referencing standard. In various embodiments, AGORA-C is a method known in the art for map-based on-the-fly location referencing, which supports machine-to-machine location descriptions.

In the case of moving events, the information sent can include information about a moving vehicle, such as license plate and description. Furthermore, the location information of moving events can be dynamically changing based on time, estimated speed and starting location of the event, input from other vehicles, and the like. By using the relay process, the moving event can be tracked by the various vehicles on the road until it is intercepted by the law enforcement or other authorities.

In various embodiments, the sending device responds to driver intent by any means, including but not limited to: pushing an appropriate hardware button for a situation; selecting a menu option on a navigation system or other special purpose device. In the latter case, the driver can specify side of road for the event, his/her lane or oncoming lane for event, or other such detailed information concerning the event or event location.

In some embodiments, the various events can also include self-initiated events, which are automatically transmitted/relayed to other vehicles within immediate range. For example, the deployment of an airbag within one vehicle may cause the warning device to automatically broadcast a high priority warning message to all vehicles within range. The oncoming drivers can then be warned of the potential accident and injuries.

In one embodiment, location of the event or incident is obtained in the sending vehicle by consulting an in-vehicle digital map matched with on-board GPS location, or by other automatic techniques, such as devices reading roadside linear reference markers, or by manual observations spoken by the driver such as "one mile south of exit 127". The sent message can contain location in raw and map-matched form, and in several location referencing modes, such as linear referencing or AGORA-C location referencing.

In various embodiments, the driver-initiated vehicle-to-vehicle communications device can further include a warning notification component that issues a warning to the driver of the receiving vehicle if the message is deemed applicable. Receiving vehicles in the communications range equipped with the warning component can receive the message, read the header, and, based on its content and parameters set by the driver previously, can alert the driver to the occurrence and its location or ignore it. In addition, the message may be passed on (relayed) to all other vehicles in range. In one embodiment, each message is given a unique identifier (ID) by the original sending vehicle so that any equipped vehicle may ignore any message it has previously received, or relay it further. The notification of the event occurrence and location can include any human machine interface (HMI) such as display monitors, artificial speech and/or sound, visual map indications, alarm buttons/signals and other notifications.

In some of the embodiments, the vehicles can comprise mobile nodes in a mesh-type network, which do not require any central server to maintain communications. As such, the vehicles can function as independent units, warning one another of various road hazards, emergencies and other events perceived by the drivers. In some alternative embodiments, however, the warnings can be picked up by various central sources, such as law enforcement or emergency aid authorities.

FIG. 1 is a high level illustration of the driver-initiated warning device inside of an automobile, in accordance with various embodiments. Although this diagram depicts the interface as having certain components, such depiction is merely for illustrative purposes. It will be apparent to those skilled in the art that the components portrayed in this figure can be arbitrarily combined, divided, rearranged or removed entirely from the interface. Furthermore, it will also be apparent to those skilled in the art that additional components can be included in the interface, without departing from the scope of the various embodiments.

Any standard automobile can be equipped with an interface 104 for receiving input that describes an event observable by a driver or passenger. The interface can be placed on the control panel, center console or other section inside the vehicle, or can be integrated into a standard GPS screen interface. In this illustration, the observed event is a broken tree branch 100 which may block the road or cause damage to other automobiles traveling on road 102. Accordingly, the interface provides means for entering a description of the event and for initiating transmission of the message. For example, by using the interface 104, the user is able to specify a description, a relative location with respect to the side of the road/vehicle and the urgency of the event to other drivers traveling on the same roadway. This information can then be used by receiving vehicles in order to automatically warn the drivers of the road hazard. It should be noted that the interface for receiving driver input need not necessarily be a graphical interface and other technologies, such as voice recognition, can also be used.

Figure 2:
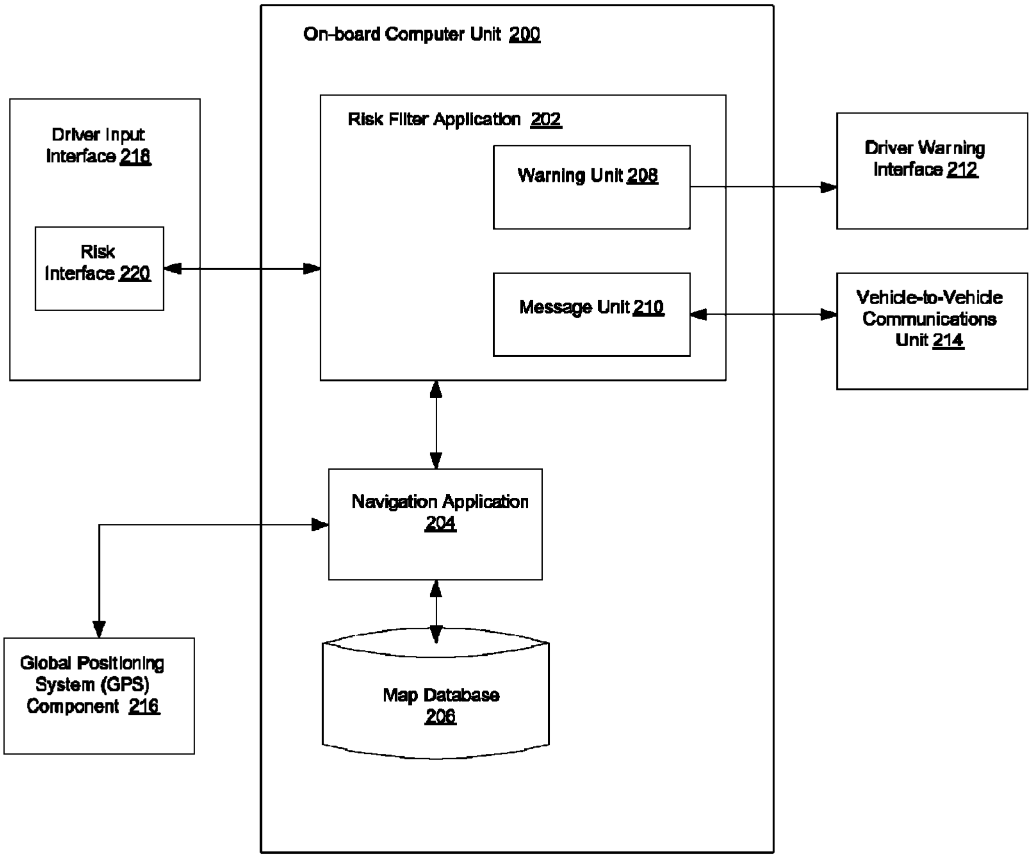
FIG. 2 is a system-level illustration of the driver-initiated vehicle-to-vehicle warning device, in accordance with various embodiments.

FIG. 2 is a system-level illustration of the driver-initiated vehicle-to-vehicle warning device, in accordance with various embodiments. Although this diagram depicts components as logically separate, such depiction is merely for illustrative purposes. It will be apparent to those skilled in the art that the components portrayed in this figure can be arbitrarily combined or divided into separate software, firmware and/or hardware. Furthermore, it will also be apparent to those skilled in the art that such components, regardless of how they are combined or divided, can execute on the same computing device or can be distributed among different computing devices connected by one or more suitable communication means.

As illustrated, the warning device includes an On-Board Computer Unit 200. The onboard computer 200 can include one or more processors and computer memory programmed with instructions for performing the various functions of the embodiments. For example, the computer can include a risk filter application 202 and a navigation application 204. The navigation application 204 provides location information to the risk filter application 202 in response to queries. The queries from the risk filter application 202 can specify that a single point location, or that all road network features within an area specified by spatial extents, are needed for calculating the location information of the event. Alternatively, selected road network features can be specified according to parameters given in the query, partly in response to driver inputs from the risk interface 220 within the driver input interface 218. The driver input interface 218 may also perform other navigation input functions for the navigation application 204. These are beyond the risk interface 220 driver inputs and can include the various direction lookups, traffic information and other related data.

In one embodiment, the navigation application 204 consults the on-board map database 206 and integrates GPS signals from the GPS Unit 216 in order to generate location information. The location information can then be included in the warning message. In addition, the location information of the receiving vehicle can be computed and compared with the location information of the event contained in the message in order to determine the applicability of the message to the receiving vehicle. In various embodiments, the vehicle's own location and requested network features can be provided to the risk filter application 202 in geographic coordinate, street address, and linear reference forms, or in any other requested formats. Based on internal parameter sets and driver input provided via the risk interface 220, the risk filter application 202 can determine whether driver warnings should be issued via the warning unit 208 by the driver warning interface 212, and if warnings are to be provided to other vehicles via the message unit 210 and the vehicle-to-vehicle communications unit 214. Accordingly, the location information can be used for both warning other vehicles and for determining the applicability of warnings to the recipient vehicle.

In various embodiments, warnings to other vehicles may take into account a number of factors. For example, traffic density information on either side of a divided highway can be considered, as obtained from the GPS component 216 or by some other means. Similarly, the device can determine whether or not a particular risk event, for example the presence of an icy spot, is applicable to one side of the highway or to both sides. Because in the preferred embodiment, the vehicle-to-vehicle communications mode is "broadcast," the warning may not be selective to a receiving vehicle position. However, sufficient information can be included in the warning message such that a receiver can decide if a particular warning is relevant. In one embodiment, the on-board map database 206 is sufficiently detailed to permit data rich messages to be transmitted.

In one embodiment, the message unit 210 and the vehicle-to-vehicle communications unit 214 can be responsible for both sending and receiving messages to and from other vehicles. For example, the vehicle-to-vehicle communications unit can receive warnings relayed from other vehicles and convey them to the risk filter application 202. The risk filter application can then interpret the information in the warning message, query the navigation application 204 for current location information and routing information for the own-vehicle, and decide if a warning should be issued to the own-vehicle driver and/or relayed to other vehicles in the vicinity. In one embodiment, this decision can be made by comparing the location of the receiving vehicle with the location of the event obtained from the incoming message. If the comparison of these locations is logically related in some way (e.g. if they are both on the same side of the road, direction of travel, etc.), the warning can be issued. Similarly, the location and heading information can be used to determine whether to relay the message. For example, if the location of the message origin has traveled too far (or too long) because of information diffusion, no more relaying may be necessary. In that instance, the onboard computer can decide to ignore the incoming message. In the various embodiments, the factors used to determine message applicability and relay decisions can be made configurable.

In various embodiments, the event message has a lifetime once it is first sent. This lifetime can be independent of the original sender. For example, the message can persist depending on traffic density and circumstances due to automatic relaying by receivers, and according to parameters set by the device itself or by the driver or any receiver. In cases where traffic is very slight, messages would not be repeated often, and low-priority messages would be expected to decay rapidly because of lack of relay receivers. In dense traffic, or for very important messages such as ice slicks on the road, messages could persist for a long time. In this manner, the lifetime and applicability of warnings can be dynamically modified according to the preferences, driving behavior and routines of the various travelers on the road.

In one embodiment, the driver-initiated vehicle-to-vehicle warning device is deployed in mobile vehicles and can function without the need for any dedicated roadside infrastructure equipment. In alternative embodiments, the device can also be mounted or otherwise integrated into certain roadside equipment, such as emergency call boxes and the like. In these embodiments, the roadside equipment can essentially function as a non-moving vehicle node and can relay the warning message to other vehicles that pass by. For example, the roadside callbox having the warning device can relay the message to other vehicles which come into the range of communication based on motion sensing technology or some other technology.

Figure 3:
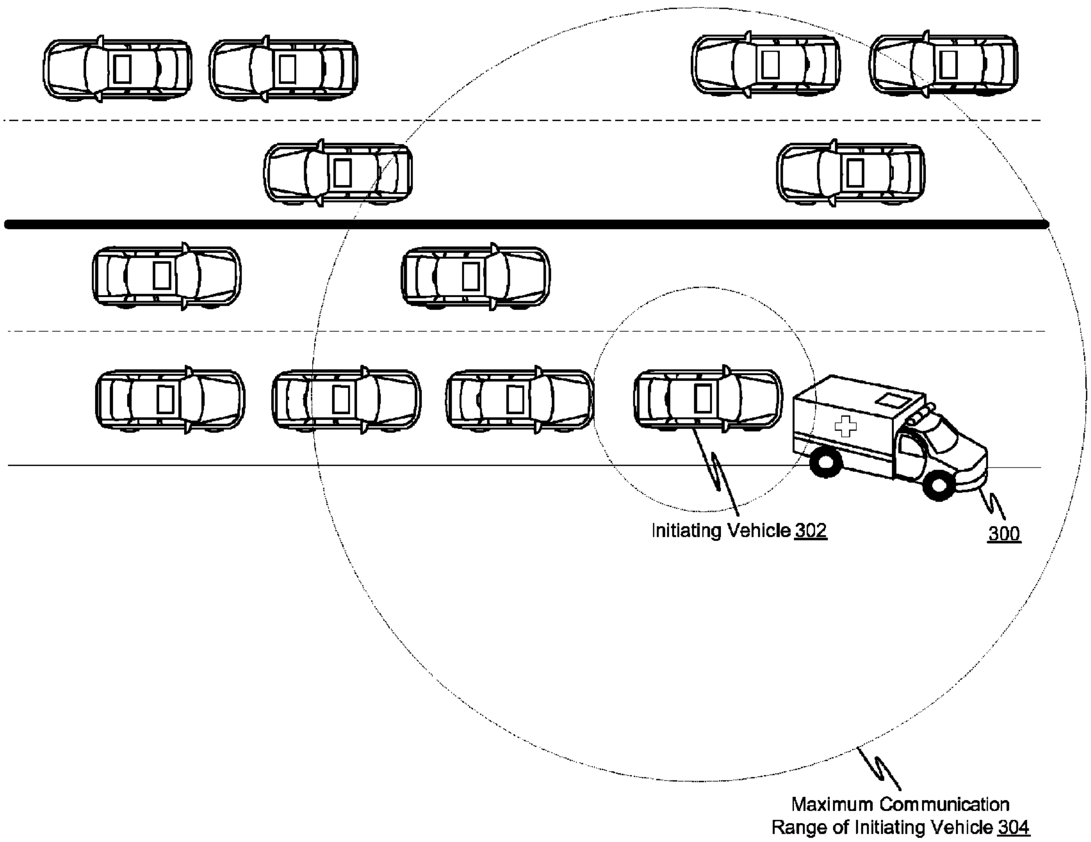
FIG. 3 is an overhead view of a traffic situation involving a vehicle equipped with a driver-initiated warning device, in accordance with various embodiments.

FIG. 3 is an overhead view of a traffic situation involving a vehicle equipped with a driver-initiated warning device, in accordance with various embodiments. As illustrated, the vehicle 302 equipped with the warning device has approached an event 300 observable by the driver. In this depiction, the event is an emergency vehicle 300 parked partially in the right lane of the freeway. The driver of the vehicle can thus initiate a message for other drivers on the road, warning them of the emergency vehicle.

As further illustrated, the initiating vehicle 302 can have a certain maximum range 304 of communication, such as 1000 meters. Accordingly, the driver of vehicle 302 broadcasts the warning message in all directions, which extends to the maximum range. It should be noted that the maximum range 304, the freeway and the various automobiles depicted in this figure are provided purely for purposes of illustration and are not drawn to scale. It will be apparent to one of ordinary skill in the art that the particular distances of communication can be implemented according to various protocols and/or preferences and the present embodiments are not limited to any particular implementation.

Figure 4:
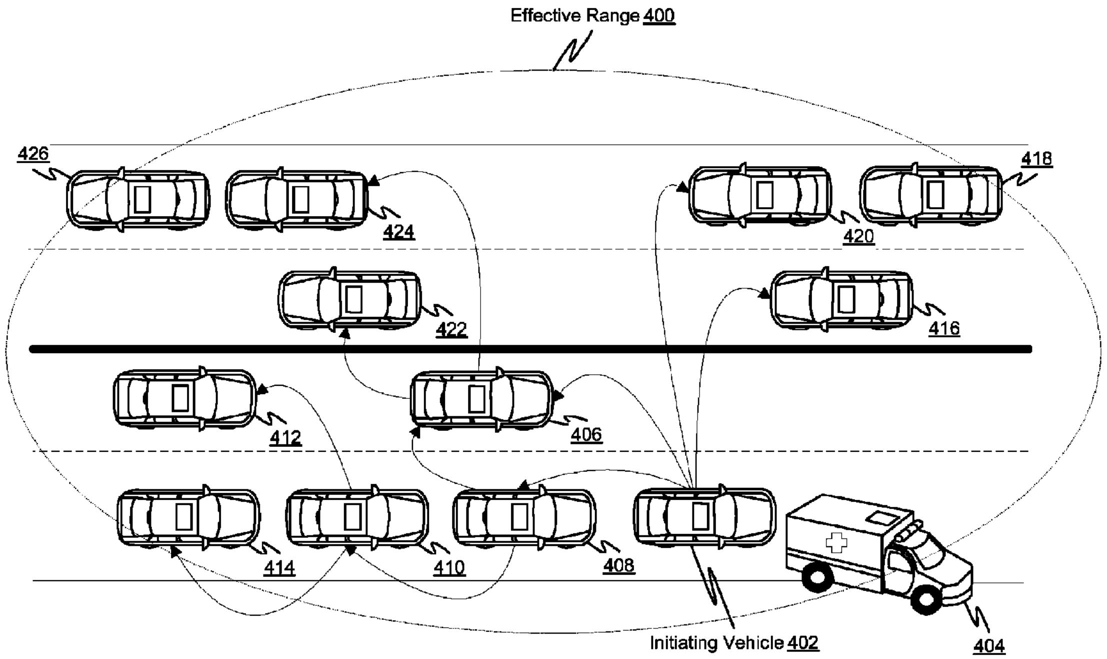
FIG. 4 is an overhead view of a traffic situation showing the relaying capability of vehicles equipped with the driver-initiated warning device, in accordance with various embodiments.

FIG. 4 is an overhead view of a traffic situation showing the relaying capability of vehicles equipped with the driver-initiated warning device, in accordance with various embodiments. Similarly to FIG. 3, the vehicle 402 equipped with a warning device has approached the emergency vehicle 404 parked on the side of the road, or partially blocking one side of the road. As illustrated, the vehicle's 402 driver can initiate a warning message to be sent to other vehicles. Accordingly, vehicle 402 can broadcast message to other cars 406, 408, 416 and 420, which are within its immediate range of communication. Each of the receiving vehicles can then formulate a decision on whether to relay the incoming message to other automobiles. In one embodiment, the decision can be made based on parameters configured on the receiving vehicle. For example, in some embodiments, the vehicle may choose to relay only urgent messages for events within a specified distance (e.g. 2000 meters), while other vehicles/embodiments can relay all messages which have a lifetime of less than a certain time period (e.g. 1 hour). Many other such parameters are possible as will be evident to one of ordinary skill in the art. A standard protocol may also be developed covering all cars and conditions.

As illustrated in the figure, some of the receiving vehicles 406, 408, 410 may relay the message, while other vehicles 412, 414, 416, 418, 420, 422, 424, 426 can decide not to relay. In one embodiment, the driver of the initiating vehicle 402 can initially set a high priority on the message, which will be relayed to other drivers within range. Other drivers who later pass the event location may note that the emergency vehicle 404 has left the road and that the event itself is over. In this case they can issue an 'event over' message that will cause the warning device in other vehicles to remove the priority and to cease relaying. Alternatively, some message types may be sent having an event lifetime which, when exceeded, will result in the purging of the original message. The logic of message handling, including prioritization and event lifetimes and all other handling logic, can be implemented in the risk filter application 202 (illustrated in FIG. 2).

As shown, because of the traffic density, other vehicles equipped with the invention can relay the warning, thereby causing an effective range 400 to be greater than the original maximum communications range 304 of the initiating vehicle (illustrated in FIG. 3). This enables the warning to travel for potentially greater distances than would otherwise be possible without the relaying capability. It should be noted, however, that the relaying in FIG. 4 is shown arbitrarily for purposes of simplicity only and does not necessarily depict the actual way that messages would get transmitted and relayed. In various embodiments, the specifics of when and how messages are actually relayed or purged by each vehicle will depend on the implementation selected and/or any configuration of the warning device.

Figure 5:
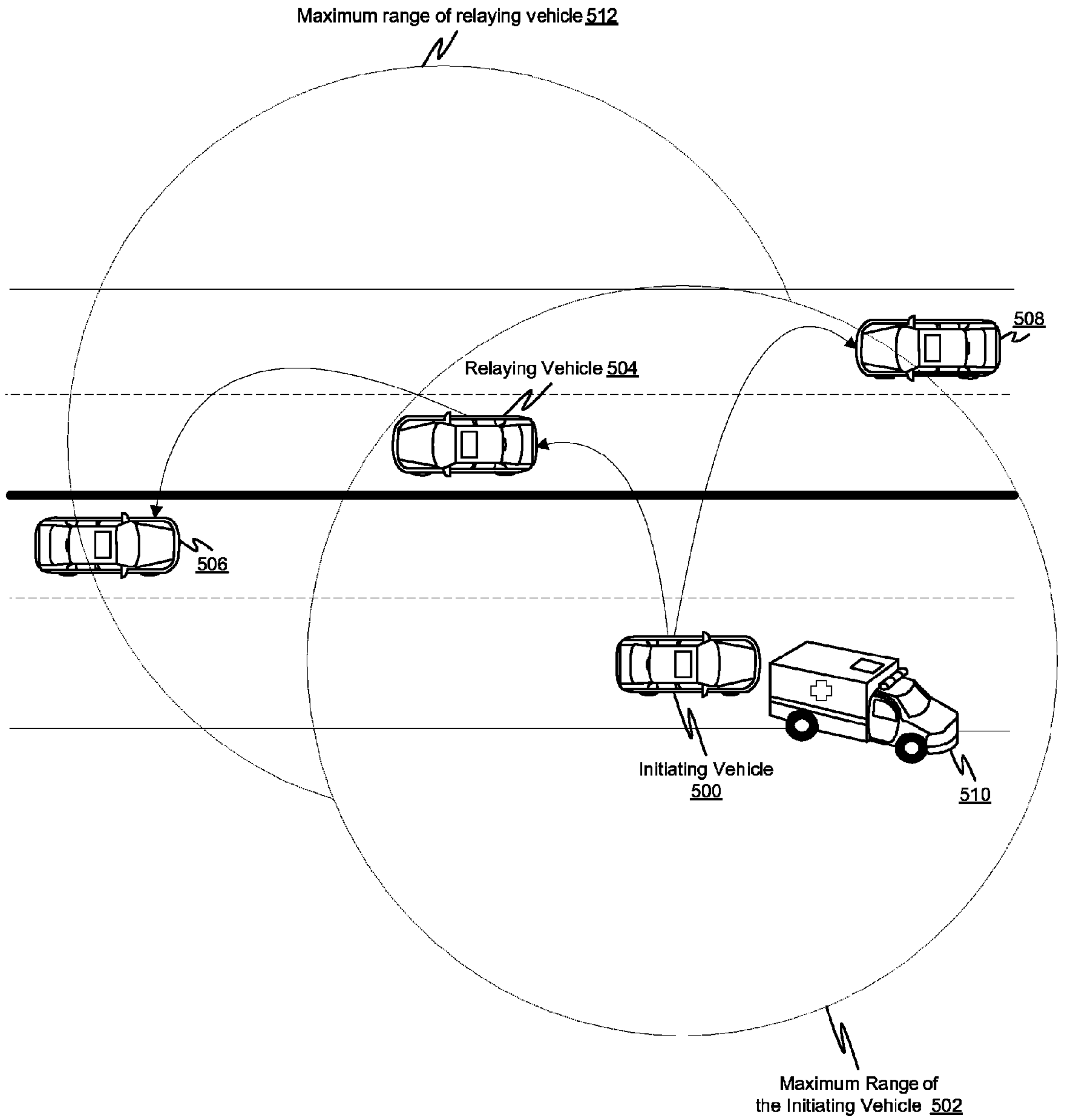
FIG. 5 is an overhead view of risk warning messages being transferred in a situation of lower traffic density, in accordance with various embodiments.

FIG. 5 is an overhead view of risk warning messages being transferred in a situation of lower traffic density, in accordance with various embodiments. As shown in this figure, vehicle 500 is traveling in the opposite direction from vehicle 504, and therefore vehicle 500 is not in a risky situation 510 in the divided highway case. Vehicle 504 thus simply relays the message to vehicle 506, which receives the warning. If vehicles 504 and 506 are not equipped with the warning device, perhaps vehicle 508 may be. In one embodiment, all vehicles equipped with the driver-initiated warning device would issue warnings for a predetermined period or for a period algorithmically determined based on traffic density and parameters set by the device and/or the initiating driver or any receiving driver. In various embodiments, the traffic density information can be obtained from the vehicle's GPS system, or via communications with other vehicles in the vicinity, or by some other means. Diffusion of the message can be more circuitous than in the case of the illustrated figures, but under most traffic densities many warnings would diffuse to other vehicles over time.

As illustrated, even in light traffic situations, the maximum range 502 of the initiating vehicle can be enlarged as a result of the movement and relaying by the equipped vehicles. For example, the maximum range 512 of the relaying vehicle has different coverage with respect to the initiating vehicle. As such, a larger area is effectively covered by adding the relay transmissions. This enlarging effect can be further magnified by delaying the relay of the message for a period of time, while the vehicle 504 is moving. This period of delay before relaying can be computed based on vehicle speed, traffic density and distance, or specified in some other manner.

Figure 6A:
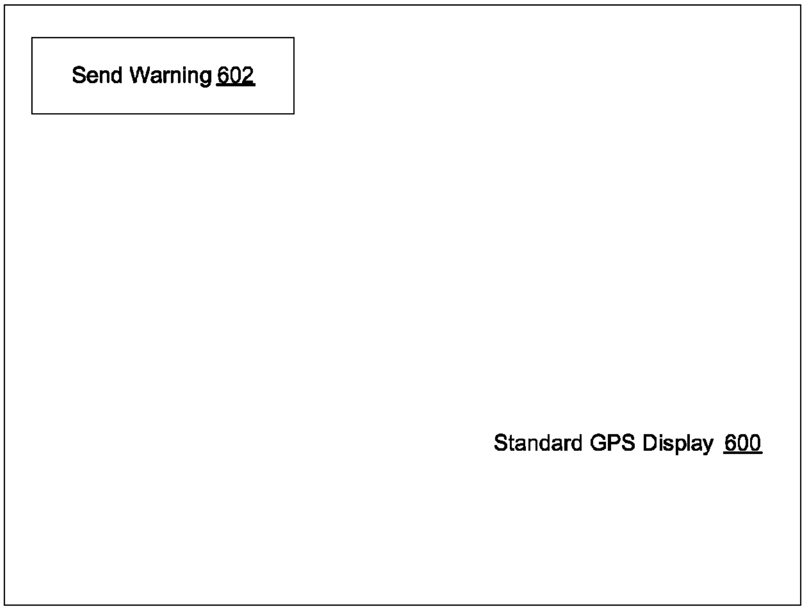
FIGS. 6A and 6B illustrate a possible set of menu options for a navigation system implementing the driver-initiated vehicle-to-vehicle warning system, in accordance with various embodiments.
Figure 6B:
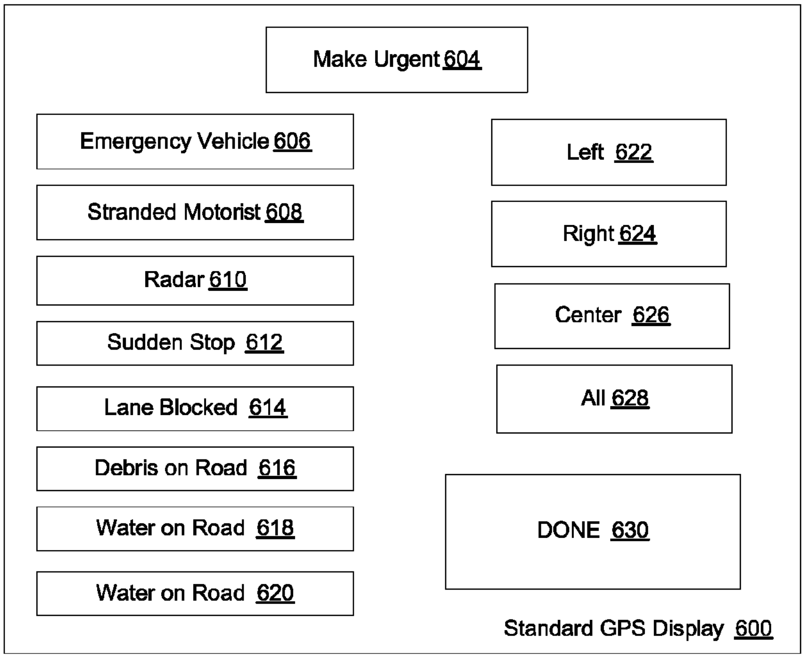

FIGS. 6A and 6B illustrate a possible set of menu options for a navigation system implementing the driver-initiated vehicle-to-vehicle warning system, in accordance with various embodiments. Although this diagram depicts components of the menu in one logical layout, such depiction is merely for illustrative purposes. It will be apparent to those skilled in the art that the components portrayed in this figure can be arbitrarily combined, divided or rearranged into separate menu options and buttons. Furthermore, it will also be apparent that additional display options, buttons and other selection components can be included in the menu.

This illustration shows a simple touch-screen system although voice-actuated systems are also possible. A touch-screen area entitled "SEND WARNING" 602 on the navigation system display 600 (FIG. 6A) leads to a sub-menu (FIG. 6B) with multiple options (604, 606, 608, 610, 612, 614, 616, 618, 620, 622, 624, 626, 628, 630) for entering the description of the event noted, its priority and location. For example, a priority "MAKE URGENT" 604 is shown, while the default priority is not-urgent or normal. The user is also given the option to specify the side of the road where the event is occurring, in order to better filter the applicability of warning to the recipient vehicles. On the submenu, any combination of menu choices can be selected; touching the "DONE" choice would end the selection process and broadcast the message to vehicles within the vicinity.

Figure 7:
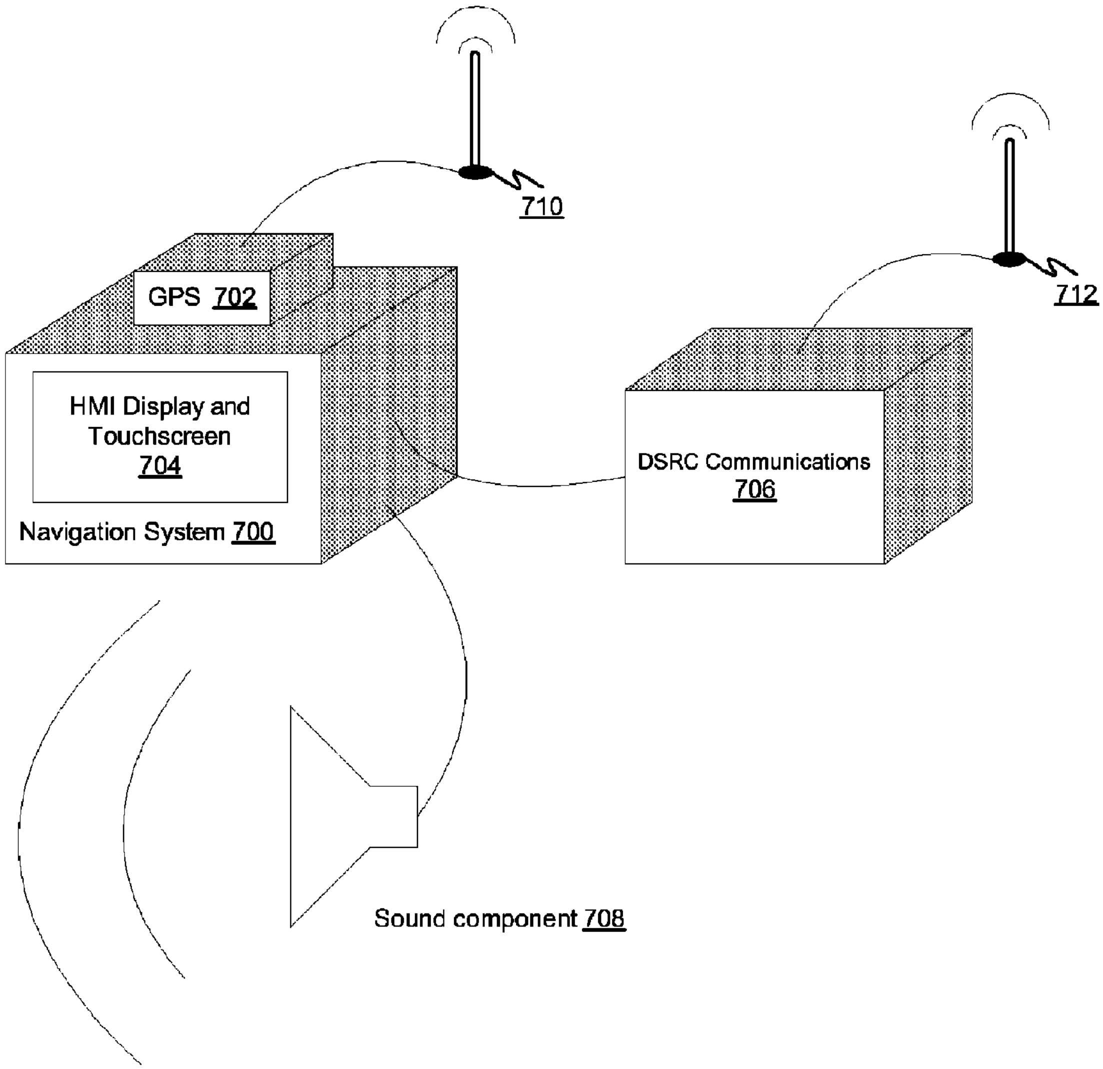
FIG. 7 illustrates the possible high level in-vehicle hardware components for the driver-initiated warning device, in accordance with various embodiments.

FIG. 7 illustrates the possible high level in-vehicle hardware components for the driver-initiated warning device, in accordance with various embodiments. Although this diagram depicts the hardware components as logically separate, such depiction is merely for illustrative purposes. It will be apparent to those skilled in the art that the components portrayed in this figure can be arbitrarily combined or divided into separate hardware.

In various embodiments, the hardware components of the device include a GPS receiver 702 and antenna 710, a processing computer such as a navigation system 700, a driver interface device for inputs from the driver and to give warnings to the driver (typically part of the navigation system human-machine interface 704, as shown), and a vehicle-to-vehicle communications device, shown as a stand-alone DSRC receiver/transmitter 706 and antenna 712. Furthermore, the system can be connected to a sound output 708 device in the vehicle, such as a set of audio speakers.

Figure 8:
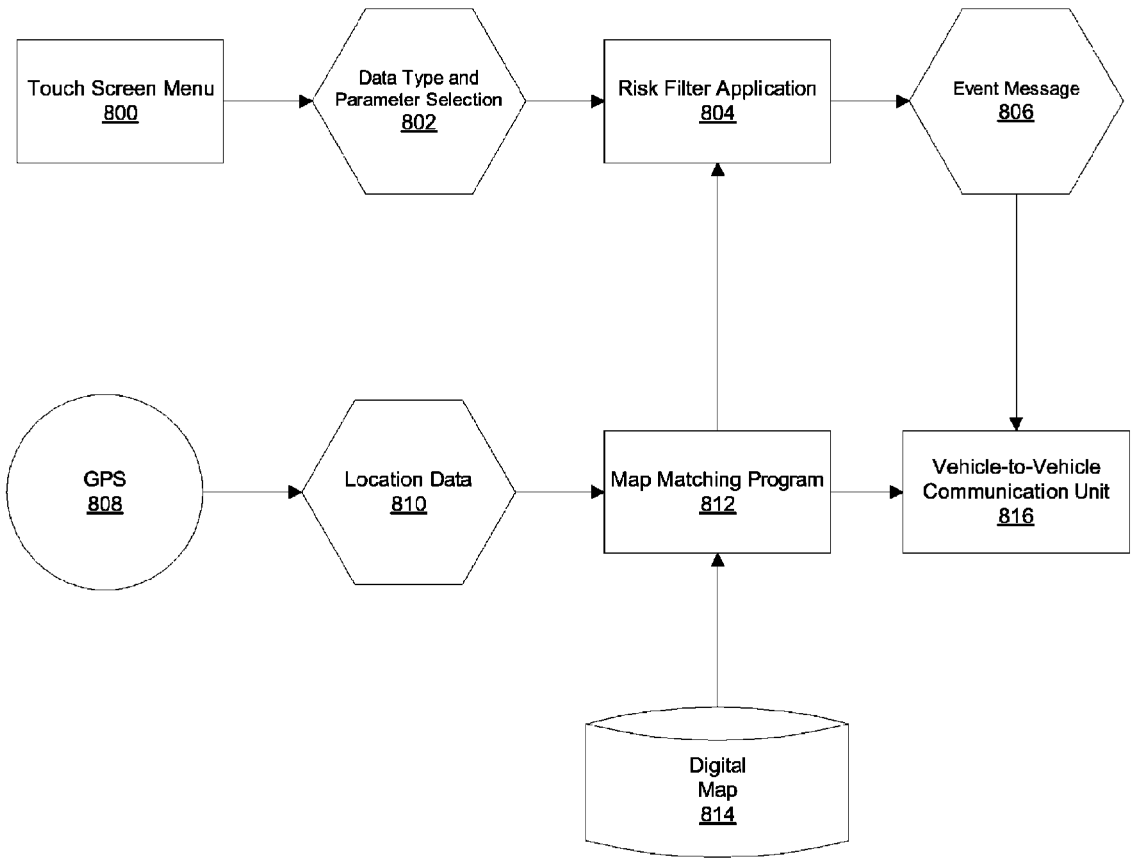
FIG. 8 is an illustration of the flow of inputs and outputs between the various components of the device during message transmission, in accordance with various embodiments.

FIG. 8 is an illustration of the flow of inputs and outputs between the various components of the device during message transmission, in accordance with various embodiments. Although the flow of data is illustrated in a particular sequence, it is not limited to this particular order. The input and output of flow of data can be rearranged into a different sequence, within the scope of the present embodiments.

As illustrated, the driver can observe an event and input the event description, priority and/or other parameters 802 via the touch screen menu 800 into the memory of the warning device. In one embodiment, the message unit within the risk filter application 804 can receive this information and combine it with location information 810 received from the GPS system 808 and the digital map 814 integrated by the map matching program 812. The event message 806 produced by combining this information can then be sent to the vehicle-to-vehicle communications unit 816 which can broadcast the message to other vehicles in the vicinity.

Figure 9:
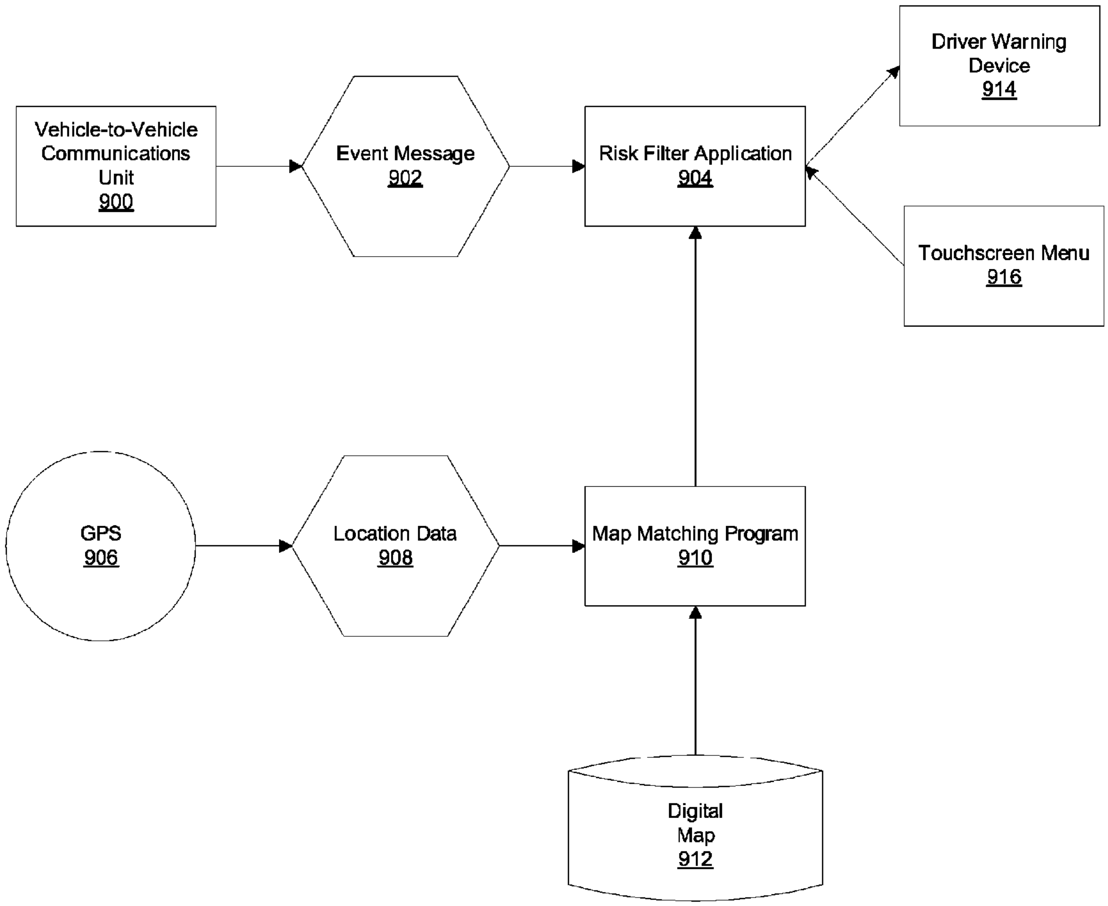
FIG. 9 is an illustration of the flow of inputs and outputs between the various components of the device during message reception and relay, in accordance with various embodiments.

FIG. 9 is an illustration of the flow of inputs and outputs between the various components of the device during message reception and relay, in accordance with various embodiments. Although the flow of data is illustrated in a particular sequence, it is not limited to this particular order. The input and output of flow of data can be rearranged into a different sequence, within the scope of the present embodiments.

As illustrated, a vehicle equipped with the warning system can receive an event message 902 via the vehicle-to-vehicle communications unit 900. The event message 902 can be passed to the message unit within the risk filter application 904, where its identifier can be compared with a local table of other event messages previously received by the vehicle. In one embodiment, if the same message has been received previously, no further action is taken. If the message is being received for the first time, the risk filter application 904 can compare the incoming message parameters (including location and priority) with the recipient vehicle's own situation and parameters set by the driver. For example, the risk filter application can receive information from the GPS 906, including the location data 908 and digital map 912 matched by the mapping application 910. This recipient vehicle's information is then compared with the location, priority and/or description of the event embedded in the incoming message. Based on the comparison, the risk filter application can determine the applicability of the event to the receiving vehicle and can decide to issue a warning to the driver through the driver warning interface 914. The risk filter application may also decide to relay the message to other drivers via the vehicle-to-vehicle communications unit. Furthermore, the receiving vehicle can also initiate new messages, such as the "EVENT OVER" message by using the touch screen interface menu 916.

Figure 10:
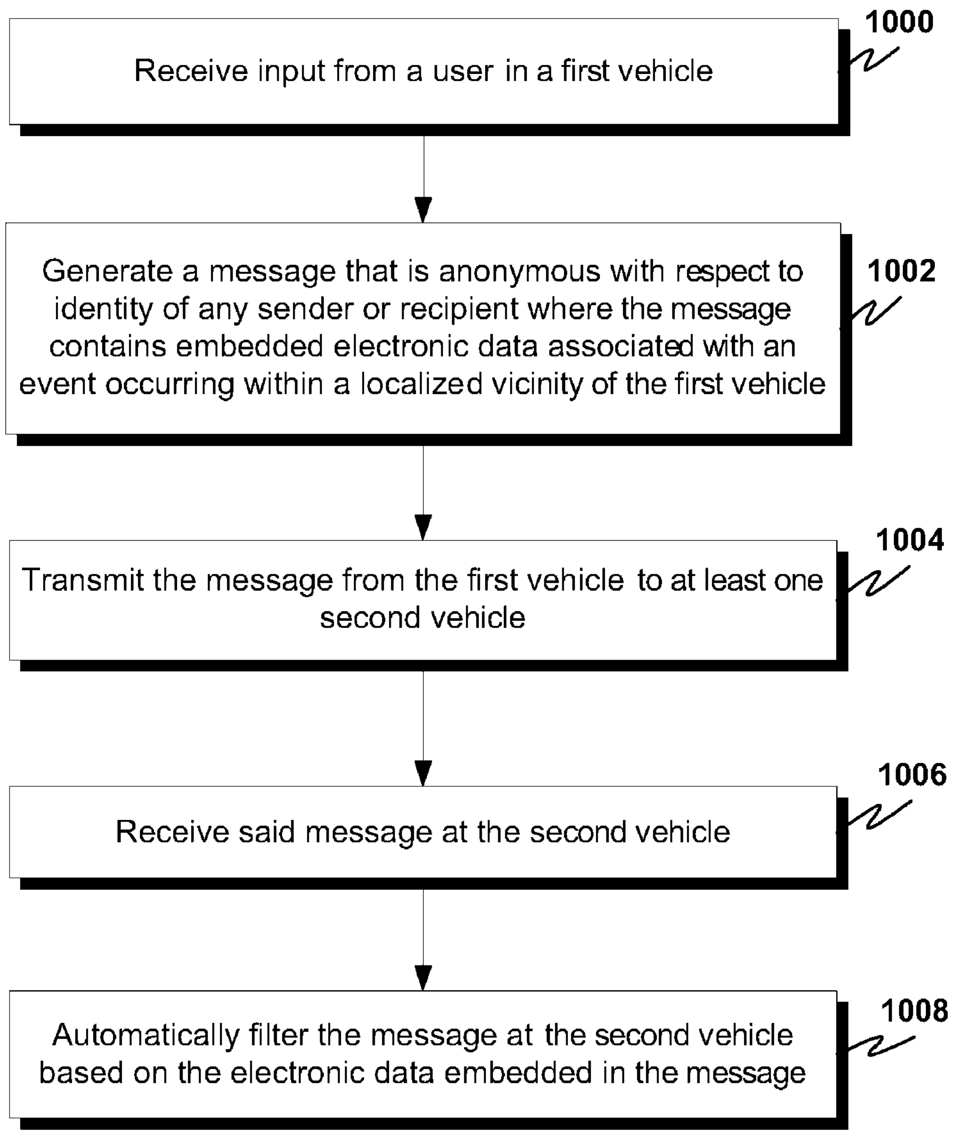
FIG. 10 is an exemplary logical flow chart diagram of the process for sending and receiving driver-initiated vehicle-to-vehicle warnings, in accordance with various embodiments.

FIG. 10 is an exemplary logical flow chart diagram of the process for sending and receiving driver-initiated vehicle-to-vehicle warnings, in accordance with various embodiments. Although this figure depicts functional steps in a particular sequence for purposes of illustration, the process is not necessarily limited to this particular order or steps. One skilled in the art will appreciate that the various steps portrayed in this figure can be changed, omitted, rearranged, performed in parallel or adapted in various ways.

As shown in step 1000, input can be received from a user in a first vehicle. The input can describe a particular event and can be entered by way of a touch screen or other interface. In step 1002, a message is generated, which is anonymous with respect to the identity of the receiver. In one embodiment, the message is independent of any identity information of the sender, receiver, or any other vehicle. The message can also contain embedded electronic data regarding the event. For example, the message can contain digital mapping coordinates of the event's location. Once the message is generated, it is transmitted to at least one recipient vehicle, as shown in step 1104. The receiving vehicles can then receive the messages (step 1106) and automatically filter the messages at the second vehicle based on the electronic data embedded in the message, as shown in step 1108. For example, the recipient vehicle can determine whether to issue a warning to the driver based on the location of the event.

Figure 11:
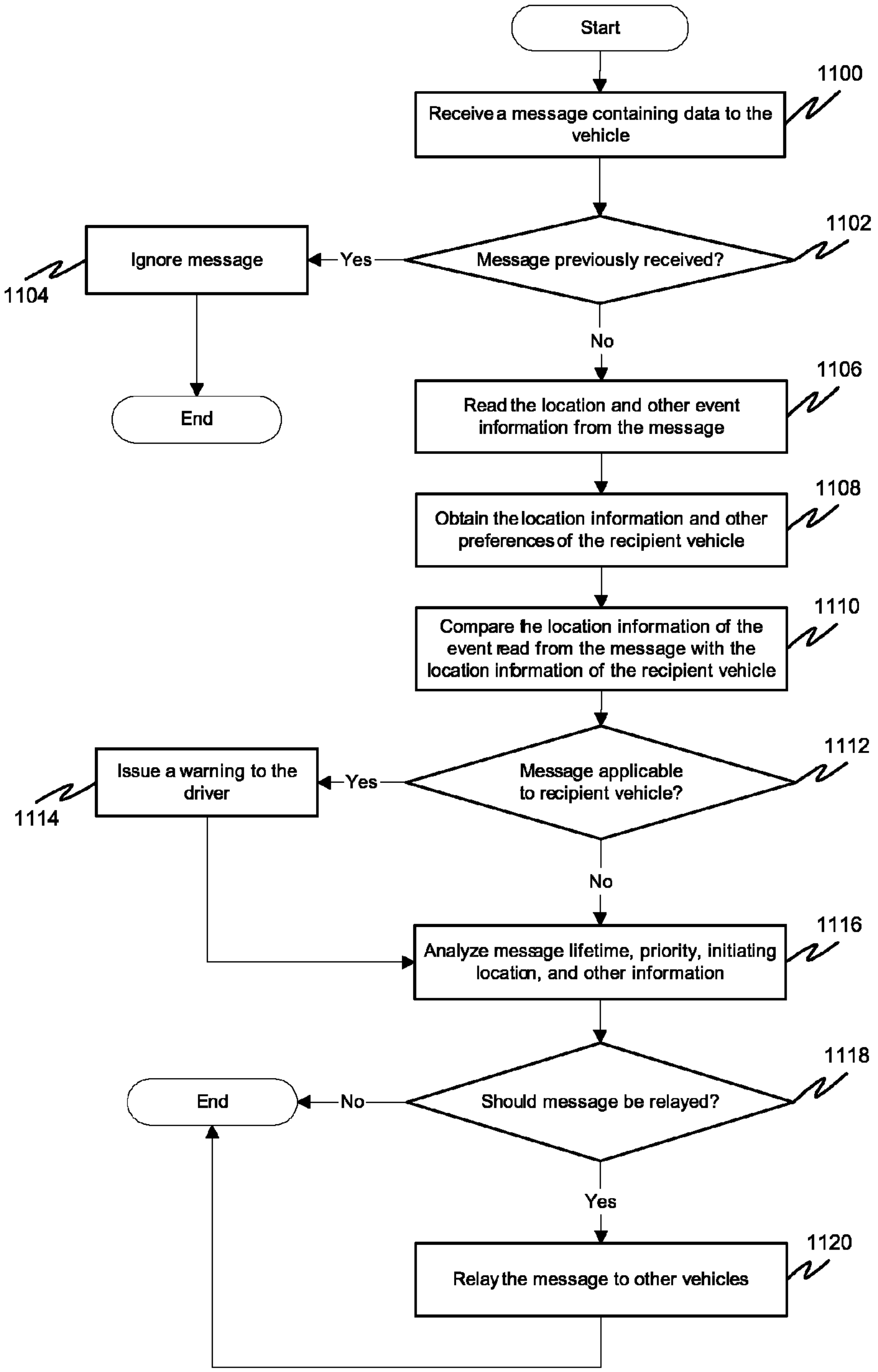
FIG. 11 is an exemplary logical flow chart diagram of the process for receiving, analyzing and relaying driver-initiated vehicle-to-vehicle warnings, in accordance with various embodiments.

FIG. 11 is an exemplary logical flow chart diagram of the process for receiving, analyzing and relaying driver-initiated vehicle-to-vehicle warnings, in accordance with various embodiments. Although this figure depicts functional steps in a particular sequence for purposes of illustration, the process is not necessarily limited to this particular order or steps. One skilled in the art will appreciate that the various steps portrayed in this figure can be changed, omitted, rearranged, performed in parallel or adapted in various ways.

As illustrated, the process begins in step 1100 when the recipient vehicle receives a broadcast warning message from another vehicle. In one embodiment, the message is a DSRC message, having a heading and other information regarding an event. In step 1102, the receiving warning device can determine whether it has previously received the same warning. In one embodiment, this can be accomplished by assigning a unique identifier to each message and by maintaining a table of recently received messages in memory. If the message has been previously received and processed, the device can simply ignore the message, as shown in step 1104. The same message can be received multiple times by the same vehicle due to the relay capability of the device. For example, if the initiating vehicle and a second relaying vehicle are both within communications range of the recipient, the recipient would receive both the initial message, as well as the relay of that message.

If the message is a new incoming message (i.e. it has not been received previously), the message can be processed and the information read, as shown in step 1106. In one embodiment, the information in the message includes mapping coordinates of a specific event. In step 1108, the warning device can also obtain the location information of the recipient vehicle by consulting the on-board GPS system. Additionally, the device can also retrieve any preferences and configuration information used to determine the applicability of events.

In step 1110, the event mapping coordinates can be compared with the location of the recipient vehicle to determine whether the event is pertinent to the vehicle. For example, if the recipient vehicle is traveling on a divided freeway and the event is a road hazard affecting only the other side of the divided freeway, the event may not be applicable to this particular vehicle. Similarly, if the vehicle is making a turn and the event's location is straight ahead, it may not be relevant. In some embodiments, the driver's preferences can also be considered when determining event relevance. For example, if the particular driver only wishes to be alerted of urgent messages, all non-urgent incoming messages can be deemed inapplicable.

Thus, in step 1112, the event can be analyzed for applicability to the receiving vehicle. If the event is applicable, a warning can be issued to the driver of the receiving vehicle, as shown in step 1114. If the event is not applicable, the process can continue.

In step 1116 and 118, the device can determine whether to relay the message to any other vehicles. In various embodiments, a multitude of information can be considered when making this determination. For example, as shown in step 1116, the device may consider the message priority, its lifetime, the event's location, the distance between the receiving vehicle and the event's location, default device preferences, any previously received "event over" messages, and other information. For example, if a particular message has been continuously relayed for more than a specified time period (e.g. several hours), it can be deemed stale and would not be relayed. Similarly, if the distance between the event and the vehicle is greater than a certain threshold, it may not be relayed. Furthermore, if the recipient vehicle has previously received an "event over" message from a different vehicle, it would likely decide not to relay the initial message.

If in step 1118, the analysis yields a decision that the message should be relayed, the message can be relayed to other vehicles, as shown in step 1120. In one embodiment, this can be done by waiting a certain time period (e.g. a number of seconds) before re-broadcasting the message by the recipient vehicle. In one embodiment, the time period can vary depending on traffic density, vehicle current speed and other parameters. For example, if the vehicle is traveling at a high rate of speed on the highway, the waiting period between relays should be shorter than vehicles traveling slow in rush hour traffic.

The various embodiments described above include a computer program product which is a storage medium (media) having instructions stored thereon/in which can be used to program a specialized computing processor(s)/device(s) to perform any of the features and processes presented herein. The storage medium can include, but is not limited to, one or more of the following: any type of physical media including floppy disks, optical discs, DVDs, CD-ROMs, micro drives, magneto-optical disks, holographic storage, ROMs, RAMs, PRAMS, EPROMs, EEPROMs, DRAMs, VRAMs, flash memory devices, magnetic or optical cards, nanosystems (including molecular memory ICs); paper or paper-based media; and any type of media or device suitable for storing instructions and/or information.

Various embodiments also include a computer program product that can be transmitted in whole or in parts and over one or more public and/or private networks wherein the transmission includes instructions which can be used by one or more processors to perform any of the features presented herein. In various embodiments, the transmission may include a plurality of separate transmissions.

Stored one or more of the computer readable medium (media), the present disclosure includes software for controlling both the hardware of computing device(s) and/or processor(s), and for enabling the computer(s) and/or processor(s) to interact with a human user or other mechanism utilizing the results of the present invention. Such software may include, but is not limited to, device drivers, operating systems, execution environments/containers, user interfaces and applications.

The foregoing description of the preferred embodiments of the present invention has been provided for purposes of illustration and description. It is not intended to be exhaustive or to limit the invention to the precise forms disclosed. Many modifications and variations can be apparent to the practitioner skilled in the art. Embodiments were chosen and described in order to best explain the principles of the invention and its practical application, thereby enabling others skilled in the relevant art to understand the invention. It is intended that the scope of the invention be defined by the following claims and their equivalents.

What is claimed is:

1. An apparatus deployable within a first vehicle, comprising:

an input interface; and a vehicle-to-vehicle communications component arranged to:

generate a message regarding a first event in response to at least one of: (i) an input received on the input interface; and (ii) initiation of one or more systems within the first vehicle, said generated message comprising information indicating a location of the first event; and broadcast said generated message regarding the first event to at least one second vehicle within the broadcast range of the vehicle-to-vehicle communications component;

wherein said vehicle-to-vehicle communications component is further arranged to receive a message regarding a second event generated and broadcast by a third vehicle; and wherein said apparatus further comprises:

a risk filter component arranged to determine whether the received message is applicable to the first vehicle based at least on a location of the second event embedded in said received message and determine whether the received message is redundant and determine whether to relay said received message regarding the second event to at least one fourth vehicle based on at least one of: a dynamically modifiable lifetime of the received message or a receipt of a stop message indicating the second event has ended from another vehicle and broadcast the received message to the at least one fourth vehicle based on the relay determination; and a warning component arranged to issue a warning to a driver of the first vehicle if said received message is determined to be applicable to said first vehicle and is non-redundant by the risk filter component;

wherein said vehicle-to-vehicle communications component is further arranged to:

generate a stop message indicating the second event has ended in response to an input received on the input interface following an issuance of a warning by the warning component; and broadcast said generated stop message to the at least one fourth vehicle within the broadcast range of the vehicle-to-vehicle communications component.

2. The apparatus of claim 1, wherein the vehicle-to-vehicle communications component is arranged to broadcast said received message after waiting a certain time period following receipt of said message.

3. The apparatus of claim 2, wherein said certain time period is determined based on at least one of: traffic density; road type; and speed of the first vehicle.

4. The apparatus of claim 1, wherein at least one of said generated message regarding the first event and said generated stop message regarding the second event is anonymous with respect to any identity information of said first vehicle or a driver thereof.

5. The apparatus of claim 1, further comprising a global positioning system arranged to track a location of said first vehicle, and wherein said information indicating a location of the first event in said generated message is provided by the global positioning system.

6. The apparatus of claim 1, wherein the input interface is further arranged to receive a description of said first event, and said generated message further comprises said description of said first event.

7. A method for providing event warnings to a driver of a first vehicle, said method comprising:

generating a message at the first vehicle regarding a first event in response to at least one of: (i) an input received from a driver of the first vehicle; and (ii) initiation of one or more systems within the first vehicle, said generated message comprising information indicating a location of said first event; and broadcasting said generated message regarding the first event to at least one second vehicle within the broadcast range of the first vehicle;

said method further comprising:

receiving a message regarding a second event generated and broadcast by a third vehicle;

determining whether to relay said received message regarding the second event to at least one fourth vehicle based on at least one of: a dynamically modifiable lifetime of the received message or a receipt of a stop message indicating the second event has ended from another vehicle and broadcasting the received message to the at least one fourth vehicle based on the relay determination;

determining whether the received message is applicable to the first vehicle based at least on a location of the second event embedded in said received message and determining whether the received message is redundant;

issuing a warning to the driver of the first vehicle if said received message is determined to be applicable to said first vehicle and is non-redundant;

generating a stop message indicating the second event has ended in response to an input received from the driver of the first vehicle following the issuance of a warning; and broadcasting said generated stop message to the at least one fourth vehicle within the broadcast range of the first vehicle.

8. The method of claim 7, wherein said received message is broadcast after waiting a certain time period following receipt of said message.

9. The method of claim 8, wherein said certain time period is determined based on at least one of: traffic density; road type; and speed of the first vehicle.

10. The method of claim 7, wherein at least one of said generated message regarding the first event and said generated stop message regarding the second event is anonymous with respect to any identity information of said first vehicle or a driver thereof.

11. The method of claim 7, wherein the first vehicle comprises a global positioning system arranged to track its location, and wherein said information indicating a location of the first event in said generated message is provided by the global positioning system.

12. The method of claim 7, wherein said generated message further comprises a description of the first event input by the driver of the first vehicle.

13. A non-transitory computer readable medium carrying one or more sequences of instructions, which, when executed by one or more processors, cause the one or more processors to carry out the method for providing event warnings to a driver of a first vehicle, said method comprising:

generating a message at the first vehicle regarding a first event in response to at least one of: (i) an input received from a driver of the first vehicle; and (ii) initiation of one or more systems within the first vehicle, said generated message comprising information indicating a location of said first event; and broadcasting said generated message regarding the first event to at least one second vehicle within the broadcast range of the first vehicle;

said method further comprising:

receiving a message regarding a second event generated and broadcast by a third vehicle;

determining whether to relay said received message regarding the second event to at least one fourth vehicle based on at least one of: a dynamically modifiable lifetime of the received message or a receipt of a stop message indicating the second event has ended from another vehicle and broadcasting the received message to the at least one fourth vehicle based on the relay determination;

determining whether the received message is applicable to the first vehicle based at least on a location of the second event embedded in said received message and determining whether the received message is redundant;

issuing a warning to the driver of the first vehicle if said received message is determined to be applicable to said first vehicle and is non-redundant;

generating a stop message indicating the second event has ended in response to an input received from the driver of the first vehicle following the issuance of a warning; and broadcasting said generated stop message to at least one fourth vehicle within the broadcast range of the first vehicle.

14. The apparatus of claim 1, wherein the risk filter is further arranged to use one or more driver preferences for message receipt to determine whether the received message is applicable to the first vehicle.

15. The apparatus of claim 1, wherein the generated message includes location information specifying a side of a road for the first or second event.

16. The apparatus of claim 1, wherein the risk filter determines the applicability of the received message by comparing mapping coordinates of the second event with a location of the first vehicle.

17. The apparatus of claim 1, wherein the risk filter determines the applicability of the received message by comparing a distance between the second event location and the location of the first vehicle to a predetermined threshold distance.

18. The apparatus of claim 1, wherein the received message is not applicable when the distance between the second event location and the location of the first vehicle is greater than the predetermined threshold distance.

19. The computer readable medium of claim 13, wherein the lifetime of the received message is independent of an original sender of the received message.

20. The apparatus of claim 1, wherein the risk filter component arranged to determine whether the received message is applicable to the first vehicle based at least on a location of the second event embedded in said received message and determine whether the received message is redundant and determine whether to relay said received message regarding the second event to at least one fourth vehicle based additionally on at least one of:

a message priority, the event's location, a distance between the receiving vehicle and the event's location, and default device preferences.

21. The computer readable medium of claim 13, wherein the lifetime is dynamically modified based on at least one of: user preferences and driving behavior of a user or a plurality of road travelers.

* * * * *